(12) United States Patent
Meng et al.

(10) Patent No.: US 10,422,945 B2
(45) Date of Patent: Sep. 24, 2019

(54) BACKLIGHT MODULE WITH SHIM FOR COMPENSATING STEP DIFFERENCE, DISPLAY APPARATUS AND ELECTRONIC DRAWING BOARD

(71) Applicants: BOE Technology Group Co., Ltd., Beijing (CN); Hefei BOE Optoelectronics Technology Co., Ltd., Hefei (CN)

(72) Inventors: Xiaoming Meng, Beijing (CN); Hui Wang, Beijing (CN); Zhiyuan Zheng, Beijing (CN)

(73) Assignees: BOE TECHNOLOGY GROUP CO., LTD., Beijing (CN); HEFEI XINSHENG OPTOELECTRONICS TECHNOLOGY CO., LTD, Anhui (CN)

( * ) Notice: Subject to any disclaimer, the term of this patent is extended or adjusted under 35 U.S.C. 154(b) by 0 days.

(21) Appl. No.: 15/576,640

(22) PCT Filed: Apr. 26, 2017

(86) PCT No.: PCT/CN2017/081997
§ 371 (c)(1),
(2) Date: Nov. 22, 2017

(87) PCT Pub. No.: WO2017/193812
PCT Pub. Date: Nov. 16, 2017

(65) Prior Publication Data
US 2018/0149804 A1 May 31, 2018

(30) Foreign Application Priority Data
May 11, 2016 (CN) ...................... 2016 2 0434031 U

(51) Int. Cl.
*G09G 3/34* (2006.01)
*F21V 8/00* (2006.01)
*G06F 3/046* (2006.01)

(52) U.S. Cl.
CPC ......... *G02B 6/0081* (2013.01); *G02B 6/0055* (2013.01); *G06F 3/046* (2013.01); *G02B 6/0043* (2013.01)

(58) Field of Classification Search
CPC ................. G09G 3/16–3/19; G09G 3/34–3/38
See application file for complete search history.

(56) References Cited

U.S. PATENT DOCUMENTS 7,012,655 B2   3/2006  You et al.
9,158,398 B2  10/2015  Jeong et al.
(Continued)

FOREIGN PATENT DOCUMENTS

CN   1534335 A   10/2004
CN 101587251 A   11/2009
(Continued)

OTHER PUBLICATIONS

International Search Report and Written Opinion and English Translation of International Search Report and Written Opinion from International Patent Application No. PCT/CN2017/081997, dated Jul. 28, 2017, 17 pages.

*Primary Examiner* — Sanghyuk Park
(74) *Attorney, Agent, or Firm* — Westman, Champlin & Koehler, P.A.

(57) ABSTRACT

There are provided a backlight module, a display apparatus and an electronic drawing board. The backlight module includes a light guide plate, a printed circuit board located on a side of the light guide plate facing away from a light exit side thereof and having a wiring protrusion protruding from a surface of the printed circuit board. A shim is disposed between the light guide plate and the printed circuit
(Continued)

board and configured to partially compensate a step difference formed due to the wiring protrusion.

20 Claims, 3 Drawing Sheets

(56) References Cited

U.S. PATENT DOCUMENTS

| | | | |
|---|---|---|---|
| 2009/0289909 A1 | 11/2009 | Lin | |
| 2009/0303411 A1* | 12/2009 | Kawato | B29D 11/00605 |
| | | | 349/61 |
| 2010/0097542 A1* | 4/2010 | Lee | G02B 6/0083 |
| | | | 349/62 |
| 2010/0171891 A1 | 7/2010 | Kaji et al. | |
| 2012/0097894 A1* | 4/2012 | Nakayama | C08K 3/22 |
| | | | 252/299.5 |
| 2013/0016267 A1* | 1/2013 | Ko | G06F 1/1637 |
| | | | 348/333.01 |
| 2014/0092630 A1* | 4/2014 | Franklin | G02B 6/0031 |
| | | | 362/609 |
| 2015/0289367 A1* | 10/2015 | Kim | G02B 6/0083 |
| | | | 349/65 |

FOREIGN PATENT DOCUMENTS

| | | | | |
|---|---|---|---|---|
| CN | 103278965 A | 9/2013 | | |
| CN | 103389589 A | 11/2013 | | |
| CN | 103543898 A | 1/2014 | | |
| CN | 205594265 U | 9/2016 | | |
| WO | WO 2018080231 A1 * | 5/2018 | | C09J 7/02 |

* cited by examiner

BACKLIGHT MODULE WITH SHIM FOR COMPENSATING STEP DIFFERENCE, DISPLAY APPARATUS AND ELECTRONIC DRAWING BOARD

CROSS-REFERENCE TO RELATED APPLICATION

The present disclosure is a Section 371 National Stage Application of International Application No. PCT/CN2017/081997, filed Apr. 26, 2017 and published as WO/2017/193812 on Nov. 16, 2017, and claims priority of Chinese Patent Application No. 201620434031.2 filed on May 11, 2016 and entitled "BACKLIGHT MODULE, DISPLAY APPARATUS AND ELECTRONIC DRAWING BOARD", the whole disclosure of which are incorporated herein by reference.

BACKGROUND OF THE DISCLOSURE

Field of the Disclosure

The present disclosure relates to the field of display technologies, and in particular, to a backlight module, a display apparatus and an electronic drawing board.

Description of the Related Art

TFT-LCD (Thin Film Transistor Liquid Crystal Display) is generally consisted of a liquid crystal display panel and a backlight module mounted at a non-display side of the liquid crystal display panel, and the backlight module is used as a light source for the liquid crystal display panel. The backlight module is often provided with a PCB board (Printed Circuit Board). The PCB board includes electronic elements and wirings for connecting the electronic elements.

SUMMARY

According to an aspect, the present disclosure provides a backlight module, comprising:

a light guide plate;

a printed circuit board located on a side of the light guide plate facing away from a light exit side of the light guide plate, the printed circuit board having a wiring protrusion protruding from a surface of the printed circuit board; and a shim disposed between the light guide plate and the printed circuit board and configured to partially compensate a step difference formed due to the wiring protrusion.

In an embodiment, the shim comprises a flexible layer.

In an embodiment, the shim further comprises a rigid layer at a side of the flexible layer adjacent to the light guide plate.

In an embodiment, the flexible layer has a thickness of 0.1 mm to 0.3 mm.

In an embodiment, a material for forming the flexible layer comprises a foam material.

In an embodiment, the foam material has a compression ratio of 20% to 30%.

In an embodiment, the rigid layer has a thickness of 0.05 mm to 0.15 mm.

In an embodiment, a material for forming the rigid layer comprises a resin material.

In an embodiment, the resin material comprises glass fibers doped therein.

In an embodiment, a reflective sheet is provided between the light guide plate and the shim.

In another aspect of the present disclosure, there is provided a display apparatus, comprising the backlight module as described above.

In a further aspect of the present disclosure, there is provided an electronic drawing board, comprising the backlight module as described above.

In an embodiment, the backlight module comprises an EMR sensing panel.

BRIEF DESCRIPTION OF THE DRAWINGS

In order to illustrate technical solutions in embodiments of the present disclosure or in the prior arts more clearly, a simple introduction to the drawings for depiction of embodiments of the disclosure or the prior arts will be set forth below. It is apparent that, the drawing as illustrated below are only some exemplary embodiments of are the present disclosure, and other drawings may also be obtained by those skilled in the art on a basis of these drawings without paying any creative labor.

DETAILED DESCRIPTION OF PREFERRED EMBODIMENTS

Technical schemes in embodiments of the present disclosure will be described clearly and completely with reference to the accompanying drawings illustrated in the embodiments of the present disclosure. Obviously, the described embodiments are merely a part of embodiments of the present disclosure, rather than being all embodiments thereof. Based on the embodiments of the present disclosure, all other embodiments arrived at by those ordinary skilled in the art without any inventive efforts will fall within the scope of the present disclosure.

In related arts, in order to protect the electronic elements and the wiring on the PCB, ink, i.e., a solder mask, will cover surfaces of the electronic elements and the wirings. However, for some particular PCB boards, for example, for a display manufactured through EMR (Electro Magnetic Resonance Technology), where an EMR sensing panel is provided in the backlight module, in order that the EMR sensing panel can sense motion of an inductive pen, wirings on the EMR sensing panel needs to be higher than a surface of the above solder mask, thereby forming wiring protrusions. In such case, when a light guide plate is provided above the EMR sensing panel, the light guide plate will be recessed inwardly at a position where it contacts the above wiring protrusion, thereby diffuse reflection of light inside of the light guide plate will be increased at the recess, so that a light emitting amount of the light exit side of the light guide plate will be greatly increased at a position corresponding to the wiring protrusion, resulting in that a bright spot will occurs at the position, uniformity of backlight brightness is reduced, and display effect is adversely affected.

Figure 1:
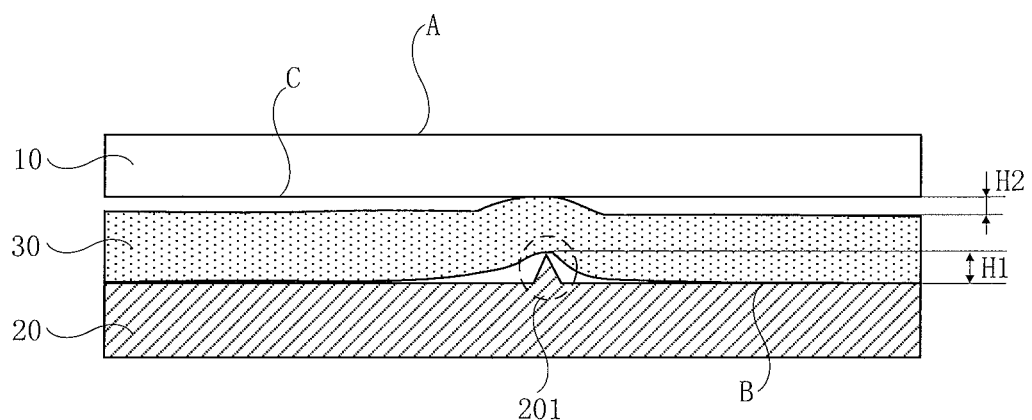
FIG. 1 is a structural schematic diagram of a backlight module according to the present disclosure.

The present disclosure provides a backlight module, as shown in FIG. 1, comprising a light guide plate 10 and a PCB (Printed Circuit Board) 20 located on a side of the light guide plate 10 facing away from a light exit side A, the PCB having a wiring protrusion 201 protruding from a surface B of the PCB (sometimes, PCB is abbreviated as PCB board, and thus the surface of PCB is shortly termed as board surface). Further, a shim 30 is disposed between the light guide plate 10 and the PCB 20 and configured to partially compensate a step difference or height difference formed due to the wiring protrusion 201. Specifically, the expression "partially compensate a step difference or height difference formed due to the wiring protrusion 201" is meant to: the height difference of the surface of the shim 30 close to the surface of the light guide plate 10 at a position corresponding to the wiring protrusion 20 with respect to a planar region of the surface of the light guide plate is less than that of the wiring protrusion 201 with respect to the other planar region of the board surface B.

In an embodiment, as shown in FIG. 1, a surface of the shim 30 adjacent to light guide plate 10 has a height difference or step difference (for example, with respect to a planar region therearound) H2 at a position corresponding to the wiring protrusion 201, and a surface of the shim 30 facing away from light guide plate 10 has a height difference or step difference (for example, with respect to other planar region of the board surface B) H1 larger than H2 at a position corresponding to the wiring protrusion 201.

Figure 2:
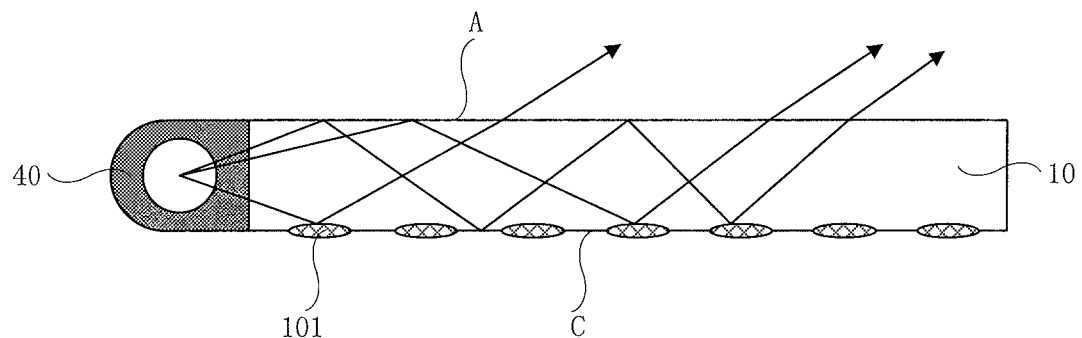
FIG. 2 is a schematic diagram showing a specific structure of a light guide plate shown in FIG. 1.

It is noted that the backlight module provided with the light guide plate 10 is generally an edge-lit backlight module where, as shown in FIG. 2, a light source 40 is arranged at a lateral surface of the light guide plate 10, and light emitted from the light source 40, after entering the light guide plate 10, will be transmitted via total reflection inside the light guide plate 10. In this case, in order to outgo the light from the light exit side A of the light guide plate 10, it is required to manufacture mesh dots 101 on a side surface C of the light guide plate 10 facing away from the light exit side A, which will destroy the total reflection on the surface C of the light guide plate 10, such that the light transmitted inside the light guide plate 10 will undergo diffuse reflection at the mesh dots 101 and uniformly exit from the light exit side A. The mesh dots 101 may be manufactured through a screen printing process or a laser dotting process.

In such case, when the PCB having the above wiring protrusion 201 is in direct contact with the surface C of the light guide plate 10, the height of wiring protrusion 201 is greater than the height of the mesh dot 101, thus the light transmitted inside the light guide plate 10 will undergo more diffuse reflection at the wiring protrusion 201 than at the mesh dot 101, and accordingly more light will exit from the light exit side A of the light guide plate 10 at a position corresponding to the wiring protrusion 201, thereby generating a bright spot.

However, in the backlight module provided according to the present disclosure, the shim 30 is provided between the light guide plate 10 and the PCB 20 such that a step difference formed due to the wiring protrusion 201 can be partially compensated. Therefore, the shim 30 can improve flatness of a surface of the shim 30 adjacent to the light guide plate 10, such that flatness of the surface C of the light guide plate 10 facing away from the light exit side A, that is, a surface of the light guide plate 10 on a light guide side thereof, can be improved, thereby light guide effect is the same or approximately the same at respective positions on the surface C of the light guide plate 10. As such, light emitted from the light exit side A of the light guide plate 10 is uniform, avoiding bright spot from being generated on the light exit side A of the light guide plate 10 caused due to the wiring protrusion 201 on the PCB.

Figure 4:
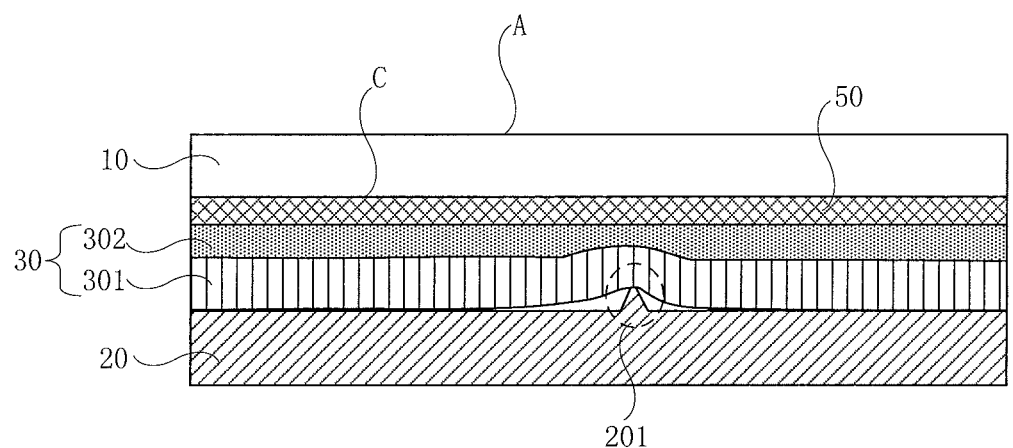
FIG. 4 is a structural schematic diagram of a backlight module with a reflective sheet added on basis of that shown in FIG. 3.

On basis of the above, in order to improve utilization of light emitted by the light source 40, a reflective sheet 50 may be provided between the light guide plate 10 and the shim 30, as shown in FIG. 4. Light outgoing from the surface C of the light guide plate 10 may be reflected back into the light guide plate 10 by the reflective sheet 50, thereby achieving re-use of light or a better light mixing effect. Also, in order to further improve utilization of light, a reflective sheet may be provided on a surface of the light guide plate 10 facing the light source 40.

A specific structure of the shim 30 layer will be described in detail below.

Figure 3:
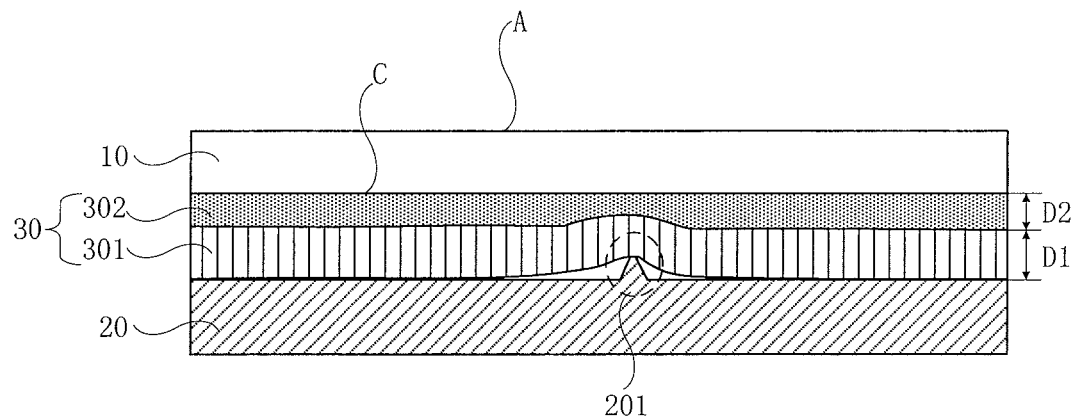
FIG. 3 is a structural schematic diagram of the backlight module shown in FIG. 1, having a shim layer including a flexible layer and a rigid layer.

In an embodiment, the shim 30 may include a flexible layer 301 as shown in FIG. 3, and the flexible layer 301 may be made of a flexible material.

As such, the flexible layer 301 has a larger flexibility, and thus when covering the PCB 20, can be bent to conform to an outer profile of the wiring protrusion 201 on the PCB 20 and surround the wiring protrusion 201, such that the height difference or step difference of a surface of the flexible layer 301 can be reduced at a position corresponding to the wiring protrusion 201, and thereby the height difference at the wiring protrusion 201 will be eliminated such that the surface of the shim 30 in contact with the surface C of the light guide plate 10 is more even.

It is noted that the above-described surface of the flexible layer 301 is a surface of the flexible layer 301 adjacent to the light guide plate 10.

On base of the above, in an embodiment, a thickness D1 of the flexible layer 301 is 0.1 mm to 0.3 mm. When the thickness D1 of the flexible layer 301 is less than 0.1 mm, the effect of mitigating the height difference H1 caused due to the wiring protrusion 201 will be poorer. When the thickness D1 of the flexible layer 301 is greater than 0.3 mm, although the height difference H1 caused due to the wiring protrusion 201 may be mitigated very well, the thickness of the backlight module will be increased, which is disadvantageous for design of an ultra-thin display apparatus. Thus, when the thickness of the flexible layer 301 is selected in the range of 0.1 mm to 0.3 mm, there will be a better effect of mitigating the height difference of the PCB 20 while not significantly increasing the thickness of the backlight module.

Further, when a material for forming the flexible layer 301 includes a foam material, a compression ratio of the foam material may be 20% to 30%. When the compression ratio of the foam material is less than 20%, the effect of mitigating the height difference H1 caused due to the wiring protrusion 201 will be poorer. When the compression ratio of the foam material is greater than 30%, although the height difference H1 caused due to the wiring protrusion 201 may be mitigated well, the thickness of the backlight module will be increased, which is disadvantageous for design of an ultra-thin display apparatus. Thus, if the compression ratio of the foam material is in the range of 20% to 30%, there will be a better effect of mitigating the height difference of the PCB 20 while not significantly increasing the thickness of the backlight module.

In addition, in order to increase rigidity of the shim 30 and avoid the flexible layer 301 from be damaged during assembling the backlight module, the shim 30 further comprises a rigid layer 302 at a side of the flexible layer 301 adjacent to the light guide plate 10. In an embodiment, a material for forming the rigid layer 302 includes a resin material. Since the resin material is a lighter material, the weight of the backlight module may be reduced. On basis of this, in order to increase the rigidity of the rigid layer 302, the rigid layer 302 may further contain glass fibers doped in the resin material.

In an embodiment, a thickness D2 of the rigid layer 302 is 0.05 mm to 0.15 mm. When the thickness D2 of the rigid layer 302 is less than 0.05 mm, the thickness of the rigid layer 302 is smaller and thereby the effect of increasing rigidity of the shim 30 is weaker. When the thickness D2 of the rigid layer 302 is greater than 0.15 mm, although the rigidity of the flat shim 30 may be increased well, the thickness of the backlight module will be increased, which is disadvantageous for design of an ultra-thin display apparatus. Thus, if the thickness D2 of the rigid layer 302 is in the range of 0.05 mm to 0.15 mm, the rigid layer 302 will has a better rigidity while not greatly increasing the thickness of the backlight module.

Figure 5:
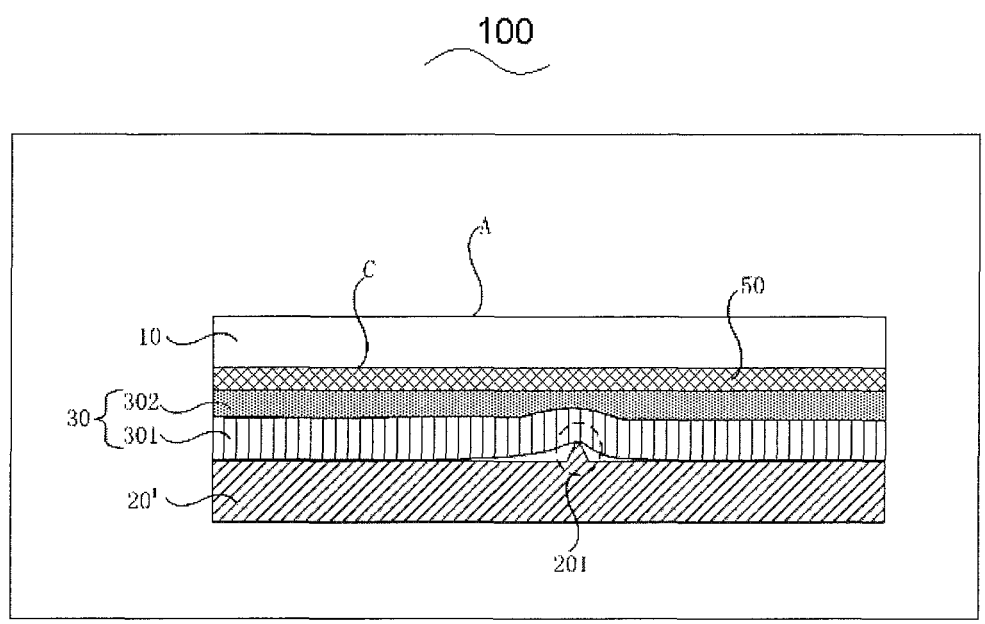
FIG. 5 is a structural schematic diagram of an electronic drawing board according to an embodiment of the present disclosure.

In an embodiment, referring to FIG. 5, the present disclosure further provides an electronic drawing board 100, comprising the backlight module as described above. In this case, the backlight module for use in the electronic drawing board needs to achieve a high-precision touch function, thus an EMR sensing panel 20' will be added into the backlight module (BLU). The backlight module in the electronic drawing board 100 has a difference in using the EMR sensing panel 20', instead of the PCB 20, and thus other same components are denoted by same reference numerals.

In order to ensure a touch control effect, a metal wiring on a surface of the EMR will be higher than the ink, which will easily lead to blank on the top or top blank, thus white spot to be poor will appear on a displayed image. In the backlight module having the shim provided according to the present disclosure, the shim has a structure, for example, including the flexible layer and the rigid layer, the flexible layer made of foam material will eliminate the top blank caused due to the wiring protrusion while the rigid layer made of PET may ensure integral rigidity of the shim and flatness of the surface of the shim in contact with the reflective sheet, so that no new defect will exist on the displayed image. Thus, the backlight module of the present disclosure can at least partially or even completely eliminate the white spot defects caused due to the wiring protrusion of the EMR.

A further embodiment of the present disclosure provides a display apparatus, comprising any backlight module as described above, and thus having the same structures and advantageous effects as those described in the above embodiments. The structure and advantageous effects of the backlight module have been described in detail in the above embodiments and thus will not be repeatedly described here.

It is noted that in an embodiment of the present disclosure, the display apparatus may particularly include a liquid crystal display apparatus, for example, the display apparatus may be liquid crystal display, liquid crystal TV, a digital photo frame, a mobile phone, a tablet computer or any other product or component having a display function.

Embodiments of the present disclosure provide a backlight module, a display apparatus and an electronic drawing board. The backlight module comprises a light guide plate and a PCB located on a side of the light guide plate facing away from a light exit side of the light guide plate, the PCB having a wiring protrusion protruding from a surface of the board. A shim is disposed between the light guide plate and the PCB and configured to partially compensate a step difference formed due to the wiring protrusion. As such, with the shim, the flatness of the surface of the shim adjacent to the light guide plate may be improved, such that flatness of the surface of the light guide plate facing away from the light exit side, that is, a surface of the light guide plate on a light guide side thereof, can also be improved, thereby light guide effect is the same or approximately the same at respective positions on the surface of the light guide plate, and light emitted from the light exit side of the light guide plate is uniform, avoiding bright spot from being generated on the light exit side of the light guide plate caused due to the wiring protrusion on the PCB.

It will be appreciated that the above embodiments are only exemplary embodiments of the present disclosure, and the present disclosure is not limited to those. Various changes or modifications may be made by those skilled in the art without departing from the principle and spirit of the present disclosure and shall fall within the scope of the present disclosure. Thus, the scope of present disclosure is defined in the claims and their equivalents.

What is claimed is:

1. A backlight module, comprising:
a light guide plate;
a printed circuit board located on a side of the light guide plate facing away from a light exit side of the light guide plate, the printed circuit board having a wiring protrusion protruding from a surface of the printed circuit board; and
a shim disposed between the light guide plate and the printed circuit board and configured to partially compensate a step difference formed due to the wiring protrusion,
wherein a surface of the shim facing away from the light guide plate has a first height difference or step difference at a position corresponding to the wiring protrusion, and a surface of the shim facing towards the light guide plate has a second height difference or step difference at a position corresponding to the wiring protrusion, the first height difference or step difference being greater than the second height difference or step difference, the first height difference or step difference being measured between the lowest position and the highest position of the surface of the shim facing away from the light guide plate, and the second height difference or step difference being measured between the lowest position and the highest position of the surface of the shim facing towards the light guide plate.

2. The backlight module according to claim 1, wherein the shim comprises a flexible layer.

3. The backlight module according to claim 2, wherein the shim further comprises a rigid layer at a side of the flexible layer adjacent to the light guide plate.

4. The backlight module according to claim 3, wherein the rigid layer has a thickness of 0.05 mm to 0.15 mm.

5. The backlight module according to claim 3, wherein a material for forming the rigid layer comprises a resin material.

6. The backlight module according to claim 5, wherein the resin material comprises glass fibers doped therein.

7. The backlight module according to claim 2, wherein the flexible layer has a thickness of 0.1 mm to 0.3 mm.

8. The backlight module according to claim 4, wherein a material for forming the flexible layer comprises a foam material.

9. The backlight module according to claim 2, wherein a material for forming the flexible layer comprises a foam material.

10. The backlight module according to claim 9, wherein the foam material has a compression ratio of 20% to 30%.

11. The backlight module according to claim 1, wherein a reflective sheet is provided between the light guide plate and the shim.

12. A display apparatus, comprising the backlight module according to claim 1.

13. The display apparatus according to claim 12, wherein the shim comprises a flexible layer and a rigid layer at a side of the flexible layer adjacent to the light guide plate.

14. The display apparatus according to claim 13, wherein the flexible layer has a thickness of 0.1 mm to 0.3 mm, a material for forming the flexible layer comprises a foam material, and the foam material has a compression ratio of 20% to 30%.

15. The display apparatus according to claim 14, wherein the rigid layer has a thickness of 0.05 mm to 0.15 mm, a material for forming the rigid layer comprises a resin material.

16. An electronic drawing board, comprising the backlight module according to claim 1.

17. The electronic drawing board according to claim 16, wherein the backlight module comprises an EMR sensing panel.

18. The electronic drawing board according to claim 16, wherein the shim comprises a flexible layer and a rigid layer at a side of the flexible layer adjacent to the light guide plate.

19. The electronic drawing board according to claim 18, wherein the flexible layer has a thickness of 0.1 mm to 0.3 mm, a material for forming the flexible layer comprises a foam material, and the foam material has a compression ratio of 20% to 30%.

20. The electronic drawing board according to claim 19, wherein the rigid layer has a thickness of 0.05 mm to 0.15 mm, a material for forming the rigid layer comprises a resin material.

* * * * *